US011731178B2

(12) United States Patent
Wang et al.

(10) Patent No.: US 11,731,178 B2
(45) Date of Patent: Aug. 22, 2023

(54) ROLLED (FECONICRRN/AL)-2024AL COMPOSITE PANEL AND FABRICATION METHOD THEREOF

(71) Applicant: Jiangsu University, Jiangsu (CN)

(72) Inventors: Hongming Wang, Jiangsu (CN); Guirong Li, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 17/777,283

(22) PCT Filed: Jan. 15, 2021

(86) PCT No.: PCT/CN2021/072031
§ 371 (c)(1),
(2) Date: May 17, 2022

(87) PCT Pub. No.: WO2022/041636
PCT Pub. Date: Mar. 3, 2022

(65) Prior Publication Data
US 2022/0388049 A1    Dec. 8, 2022

(30) Foreign Application Priority Data
Aug. 31, 2020   (CN) .......................... 202010893508.4

(51) Int. Cl.
*B21B 1/38*  (2006.01)
*B22F 3/105*  (2006.01)
(Continued)

(52) U.S. Cl.
CPC ................ *B21B 1/38* (2013.01); *B22F 3/105* (2013.01); *B22F 3/14* (2013.01); *B22F 3/18* (2013.01);
(Continued)

(58) Field of Classification Search
CPC ........ B22F 3/24; B22F 2007/042; B22F 9/04; C22C 21/00; C22C 30/00
See application file for complete search history.

(56) References Cited

U.S. PATENT DOCUMENTS

| | | | | |
|---|---|---|---|---|
| 4,347,076 A | * | 8/1982 | Ray | ......................... C22C 45/08 |
| | | | | 148/438 |
| 11,318,566 B2 | * | 5/2022 | Hu | ......................... B23K 31/02 |

(Continued)

FOREIGN PATENT DOCUMENTS

| | | | |
|---|---|---|---|
| CN | 104862510 B | * | 9/2016 |
| CN | 109266947 | | 1/2019 |

(Continued)

OTHER PUBLICATIONS

CN-104862510-B machine translation (Year: 2016).*

(Continued)

*Primary Examiner* — Michael W Hotchkiss
(74) *Attorney, Agent, or Firm* — JCIP Global Inc.

(57) ABSTRACT

Disclosed are a rolled (FeCoNiCrR$_n$/Al)-2024Al composite panel and a preparation method therefor. The preparation method involves taking pure aluminum as a matrix, adding an FeCoNiCrR$_n$ medium-entropy alloy with a high strength and toughness as an reinforcing phase to prepare an FeCoNiCrR$_n$/Al composite material, then laminating the FeCoNiCrR$_n$/Al composite material with aluminum alloy 2024, and preparing the (FeCoNiCrR$_n$/Al)-2024Al composite board by means of hot-rolling recombination, which solves the problem that high-strength aluminum matrix composites (AMCs) are prone to instantaneous breakability and low ductility, thereby improving the overall performance of the material. The present disclosure adopts microwave sintering (MWS) to fabricate a medium-entropy alloy-reinforced AMC, and adopts hot-roll bonding to fabricate the (FeCoNiCrR$_n$/Al)-2024Al metal composite panel. The composite (Continued)

panel fabricated by the present disclosure has excellent comprehensive mechanical properties, and has high application values for promoting the application of modern lightweight and high-efficiency industrial materials in aerospace, new energy vehicles, and the like.

8 Claims, 1 Drawing Sheet

(51) Int. Cl.
   *B22F 3/14* (2006.01)
   *B22F 3/18* (2006.01)
   *B22F 3/24* (2006.01)
   *B22F 9/04* (2006.01)
   *C22C 1/04* (2023.01)

(52) U.S. Cl.
   CPC .................. *B22F 3/24* (2013.01); *B22F 9/04* (2013.01); *C22C 1/0416* (2013.01); *B21B 2001/386* (2013.01); *B22F 2009/043* (2013.01)

(56) References Cited

U.S. PATENT DOCUMENTS

| | | | | |
|---|---|---|---|---|
| 11,339,817 | B2* | 5/2022 | Hu | F16B 5/08 |
| 2007/0084527 | A1* | 4/2007 | Ferrasse | C22F 1/00 |
| | | | | 148/400 |
| 2017/0369970 | A1* | 12/2017 | Yeh | C22C 30/00 |
| 2018/0036840 | A1* | 2/2018 | Hu | B23K 15/0093 |
| 2020/0399744 | A1* | 12/2020 | Smith | C22C 1/0433 |

FOREIGN PATENT DOCUMENTS

| | | | |
|---|---|---|---|
| CN | 109338172 A | * | 2/2019 |
| CN | 110273078 | | 9/2019 |
| CN | 110480018 | | 11/2019 |
| CN | 111497374 | | 8/2020 |
| CN | 108950343 B | * | 10/2020 ............. C22C 1/051 |
| CN | 112126822 | | 12/2020 |
| KR | 102130690 B1 | * | 7/2020 |

OTHER PUBLICATIONS

CN-108950343-B machine translation (Year: 2020).*
KR102130690B1 machine translation (Year: 2020).*
CN-109338172-A machine translation (Year: 2019).*
Huang, Tiandang; et al., "Effect of carbon addition on the microstructure and mechanical properties of CoCrFeNi high entropy alloy," Science China Technological Sciences, vol. 61, No. 1, Sep. 2017, pp. 1-6.
"International Search Report (Form PCT/ISA/210) of PCT/CN2021/072031," dated May 21, 2021, with English translation thereof, pp. 1-4.
"Written Opinion of the International Searching Authority (Form PCT/ISA/237) of PCT/CN2021/072031," dated May 21, 2021, pp. 1-6.

* cited by examiner

ROLLED (FECONICRR$_N$/AL)-2024AL COMPOSITE PANEL AND FABRICATION METHOD THEREOF

CROSS-REFERENCE TO RELATED APPLICATION

This application is a 371 of international application of PCT application serial no. PCT/CN2021/072031, filed on Jan. 15, 2021, which claims the priority benefit of China application no. 202010893508.4, filed on Aug. 31, 2020. The entirety of each Df the above mentioned patent applications is hereby incorporated by reference herein and made a part of this specification.

TECHNICAL FIELD

The present disclosure belongs to the field of composite panel fabrication, and relates to a fabrication method of a rolled aluminum alloy/aluminum matrix composite (AMC) composite panel, and particularly to a (FeCoNiCrR$_n$/Al)-2024Al composite panel and a fabrication method thereof.

DESCRIPTION OF RELATED ART

Due to the introduction of a reinforcement, traditional particle-reinforced AMCs have excellent properties such as high strength, high abrasion resistance, high specific modulus, and high size stability, and thus have been widely used in manufacturing fields such as aerospace, automobile, medicine, and military. However, the low ductility and local instantaneous breakability of these materials severely limit their application range. Therefore, the development of composite panels with both the high strength of AMC and the excellent plasticity of aluminum alloy has received extensive attention, which can further improve the application potential of these materials.

New medium-entropy alloys are obtained by alloying two to four major elements in approximately equal or equal atomic proportions. Medium-entropy alloys have many excellent properties, such as high-temperature stability, high hardness, excellent corrosion resistance, and excellent abrasion resistance. The fatigue and fracture resistance of medium-entropy alloys is improved compared with that of high-entropy alloys, which enables excellent plasticity and toughness while ensuring high strength. When a medium-entropy alloy is used as a reinforcement of an AMC, on the one hand, the excellent interface wettability between a metal-based reinforcement and an aluminum alloy matrix makes a stable and effective interface formed between the reinforcement particles and the aluminum matrix, which solves the problems that it is difficult to form an effective interface between the existing non-metallic particle reinforcement and the aluminum matrix and the inherent brittleness and sintering temperature of the metal-based reinforcing phase are limited; and on the other hand, the sintering parameters can be reasonably adjusted to control the generation of a high-entropy alloy system of a FeCoNi$_{1.5}$CrAl FCC structure at an interface between the entropy alloy and the aluminum matrix that is beneficial to the mechanical properties of the composite, thereby achieving the improvement of both strength and toughness of the composite.

Metal composite panels are a group of multifunctional metal composites with high toughness, high damping performance, strong impact resistance and fatigue crack growth resistance, and high corrosion and abrasion resistance. Based on the high strength and plasticity of medium-entropy alloy-reinforced AMCs and the high plasticity and strength of 2024 aluminum alloy materials, the fabrication of a laminated material by rolling an aluminum alloy and an AMC is an important direction to develop a new composite panel that combines the performance of a medium-entropy alloy AMC and the performance of an aluminum alloy.

SUMMARY

Since both the AMC and the metal composite panel have excellent mechanical properties, the present disclosure fabricates a composite panel by rolling a medium-entropy alloy-reinforced AMC and a 2024 aluminum alloy, and provides a rolled aluminum alloy/medium-entropy alloy-reinforced AMC composite panel and a fabrication method thereof. In addition to improved mechanical properties, the composite panel has the characteristics of light weight, high efficiency, low cost, and the like.

The present disclosure achieves the above technical objective through the following technical means.

A fabrication method of a rolled (FeCoNiCrR$_n$/Al)-2024Al composite panel and a fabrication method thereof are provided, including: adding FeCoNiCrR$_n$ medium-entropy alloy particles with high strength and toughness as a reinforcing phase to a matrix of pure aluminum to obtain a FeCoNiCrR$_n$/Al aluminum matrix composite, where R is Y, 0<n≤0.8, and the FeCoNiCrR$_n$ medium-entropy alloy reinforcing phase is added in an amount of 10% to 30% based on a total mass of the FeCoNiCrR$_n$/Al aluminum matrix composite; and subjecting a 2024Al aluminum alloy plate and the FeCoNiCrR$_n$/Al aluminum matrix composite as raw materials to hot-roll bonding to obtain the rolled (FeCoNiCrR$_n$/Al)-2024Al composite panel.

Further, in the FeCoNiCrR$_n$ medium-entropy alloy particles, R is any one from the group consisting of B and C, and 0<n≤0.8.

Further, the fabrication method includes the following steps:

(1) weighing and mixing high-purity metal powders Fe, Co, Ni, and Cr and an R powder as raw materials according to a designed ratio to obtain a resulting mixed powder, and subjecting the resulting mixed powder to ball-milling in a ball mill tank to fabricate a medium-entropy alloy powder through mechanical alloying, where during the ball-milling, evacuation is conducted and then argon is introduced for protection;

(2) vacuum-drying the obtained medium-entropy alloy powder, mixing particles of the medium-entropy alloy powder with the matrix of aluminum powder particles to obtain a resulting mixture, and subjecting the resulting mixture to low-energy ball-milling in a ball mill to obtain a mixed powder, where during the low-energy ball-milling, evacuation is conducted and then argon is introduced for protection;

(3) drying the mixed powder, and subjecting the mixed powder to ultrasonic dispersion with an ultrasonic machine until homogeneous, followed by molding through cold isostatic pressing to obtain a blocky solid composite;

(4) placing the blocky solid composite in a crucible, followed by sintering and solidifying through microwave sintering to obtain the medium-entropy alloy particle-reinforced aluminum matrix composite; and (5) cutting the medium-entropy alloy particle-reinforced aluminum matrix composite into composite plates, placing one composite plate of the composite plates between two aluminum alloy plates, fixing the stacked plates through rivets, followed by hot-rolling.

Further, in the step (1), a powder of each element has a purity of higher than or equal to 99.95 wt % and a particle size of less than or equal to 40 μm.

Further, experimental parameters of the ball-milling in the step (1) are as follows: a ball to material mass ratio is 8:1 to 15:1; the ball-milling includes dry milling and wet milling; the dry milling is conducted, and then the wet milling is conducted; the wet milling is conducted with absolute ethanol as a process control agent in a mass fraction of 10% to 20%; the dry milling is conducted at a rotational speed of 100 r/min to 300 r/min for 20 h to 40 h, and the wet milling is conducted at a rotational speed of 200 r/min to 400 r/min for 10 h to 20 h; a powder obtained after the ball-milling has a particle size of 0.1 μm to 5 μm; and after the ball-milling is completed, the powder is vacuum-dried for 48 h to 72 h and then taken out.

Further, parameters of the ball-milling in the step (2) are as follows: a ball to material mass ratio is 5:1 to 10:1; and wet milling is conducted for 10 h to 30 h at a rotational speed of 120 r/min to 180 r/min, with absolute ethanol as a process control agent in a mass fraction of 15% to 25%.

Further, in the step (3), experimental parameters of the molding are as follows: holding time: 2 min to 5 min, and molding pressure: 200 Mpa to 300 Mpa.

Further, in the step (4), experimental parameters of the microwave sintering are as follows: sintering temperature: 400° C. to 600° C., holding time: 30 min to 50 min, heating rate: 20° C./min to 60° C./min, and vacuum degree: less than 20 Pa.

Further, the step (5) includes: cutting the FeCoNiCrR$_n$/Al composite made by the microwave sintering into the composite plates each with a diameter of 3 mm to 5 mm and a thickness of 2 mm to 3 mm, cutting an aluminum alloy into aluminum alloy plates each with a length×a width of 90 mm×70 mm and a thickness of 1 mm to 2 mm, subjecting the aluminum alloy plates to a vacuum preheating treatment in a microwave muffle furnace, where parameters of the vacuum preheating treatment are as follows: preheating temperature: 400° C. to 600° C., and holding time: 1 h to 3 h.

Further, the composite plates and the aluminum alloy plates are each subjected to a surface cleaning treatment with an angle grinder, sandpaper, and acetone, and after the surface cleaning treatment is completed, a first one of the aluminum alloy plates, one of the FeCoNiCrR$_n$/Al aluminum matrix composite plates, and a second one of the aluminum alloy plates are sequentially stacked and riveted to obtain a riveted composite panel; and parameters of the hot-rolling are as follows: the riveted composite panel is placed in a heating furnace at 300° C. to 500° C. for 5 min to 10 min and then subjected to roll bonding immediately, with a rolling reduction of 20% to 60%, a rolling speed controlled at 20 r/min to 40 r/min, and a rolling temperature of 100° C. to 150° C.

Compared with the prior art, the present disclosure has the following beneficial effects.

In structural materials, both strength and plasticity are very important performance indexes, and are related to the internal defects and dislocation motion of grains. However, for metal materials, it is usually difficult to enable both high strength and high plasticity. A twin-crystal network structure of the FeCoNiCrR$_n$ medium-entropy alloy can well solve this problem, which enables excellent plasticity and toughness while ensuring high strength; and the addition of an appropriate amount of R improves the strength and is conducive to the bonding with a matrix. When the FeCoNiCrR$_n$ medium-entropy alloy is used as a reinforcing phase of an AMC, on the one hand, the natural interfacial bonding characteristics between metals solve the problems that an effective interface is difficult to form and a reinforcing phase itself has limited brittleness in a non-metallic particle-reinforced AMC; and on the other hand, when a sintering temperature is adjusted, a FeCoNiCrAl FCC structure is easily formed at an interface between the FeCoNiCrR$_n$ medium-entropy alloy and the matrix that is conducive to enhancing the mechanical properties at an interface of the composite, thereby achieving the improvement of both strength and toughness of the composite.

The composites are prone to crack growth and fracture along an arrangement direction of a reinforcement at an interface, which has become a recognized main cause of the fracture of the composites. The 2024Al alloy is a hard aluminum material with excellent plasticity and strength. In order to further improve the fatigue crack growth resistance, plasticity, and the like of the material, the 2024Al—FeCoNiCrR$_n$/Al-2024Al metal composite panel is fabricated by roll bonding. On the one hand, the metal composite panel has both the high strength, high abrasion resistance, and high elasticity of the FeCoNiCrR$_n$/Al AMC and the mechanical properties such as high strength, high toughness, and easy deformation of the 2024Al alloy, making the composite panel have strong comprehensive mechanical properties; and on the other hand, the 2024Al and FeCoNiCrR$_n$/Al raw materials have the characteristics of light weight, high yield, and the like, and a specified amount of the FeCoNiCrR$_n$ medium-entropy alloy greatly improves the mechanical properties of the AMC, making the composite panel have advantages such as light weight, high efficiency, and low cost.

DESCRIPTION OF THE EMBODIMENTS

The present disclosure will be further described below in conjunction with the accompanying drawings and specific examples, but the protection scope of the present disclosure is not limited thereto.

Example 1

(1) Fabrication of a medium-entropy alloy powder: A FeCoNiCrC$_{0.2}$ medium-entropy alloy was adopted as a reinforcing phase. A corresponding mass of a powder of each element was calculated according to an atomic ratio of 1:1:1:1:0.2, and then powders were each weighed, mixed, and placed in a ball mill tank; evacuation was conducted and then argon was introduced; then high-energy ball-milling was conducted for mechanical alloying as follows: with a ball-to-material mass ratio of 12:1, dry milling was first conducted for 30 h at a rotational speed of 150 r/min, then absolute ethanol was added as a process control agent, and wet milling was conducted for 12 h at a rotational speed of 300 r/min; and the resulting powder was dried for 60 h to obtain the medium-entropy alloy powder.

(2) Fabrication of a composite powder: The medium-entropy alloy powder particles and a pure aluminum powder were mixed, where the reinforcing phase medium-entropy alloy powder particles had a mass fraction of 20%; and the resulting mixture was subjected to ball-milling with a ball mill under the protection of argon to obtain the composite powder, where the ball-milling was conducted as follows: in a ball-to-material mass ratio of 6:1, wet milling was conducted for 12 h at a rotational speed of 150 r/min, with absolute ethanol as a process control agent in a mass fraction of 20%.

(3) Cold isostatic pressing (CIP): The molding was conducted under the following experimental parameters: holding time: 2 min, and molding pressure: 250 Mpa.

(4) Sintering and molding: The blocky solid composite was placed in a crucible, and sintered by microwave sintering (MWS) to obtain a magnetic medium-entropy alloy particle-reinforced AMC, where experimental parameters of the MWS were as follows: sintering temperature: 500° C., holding time: 40 min, heating rate: 30° C./min, and vacuum degree: less than 20 Pa.

Figure 1:
FIG. 1 shows an optical metallographic structure of the composite panel fabricated by the method of the present disclosure.
Figure 2:
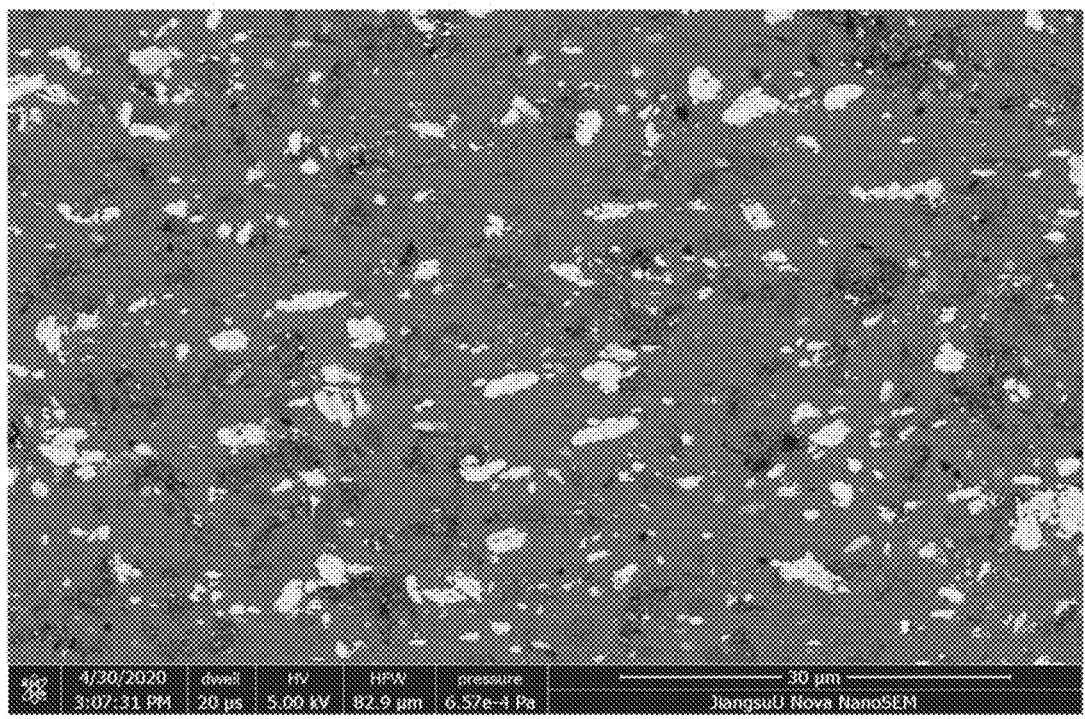
FIG. 2 shows a scanning electron microscopy (SEM) image of the composite panel fabricated by the method of the present disclosure.

(5) The FeCoNiCrC$_{0.2}$/Al composite made by MWS was cut into plates each with a diameter of 4 mm and a thickness of 2.2 mm, an aluminum alloy was cut into plates each with length×width of 90 mm×70 mm and a thickness of 1.2 mm, and the aluminum alloy plate was subjected to a vacuum preheating treatment in a microwave muffle furnace at 500° C. for 2 h; the composite and aluminum alloy plates were each subjected to a surface cleaning treatment with an angle grinder, sandpaper, and acetone, and after the surface cleaning treatment was completed, the aluminum alloy, the FeCoNiCrC$_{0.2}$/Al AMC, and the aluminum alloy were sequentially stacked and riveted; and a riveted composite panel was placed in a heating furnace at 450° C. for 8 min and then subjected to roll bonding immediately, with a rolling reduction of 36%, a rolling speed controlled at 30 r/min, and a rolling temperature of 120° C. FIG. 1 shows an optical metallographic structure of the composite panel fabricated in this example. The composite panel is fabricated by a roll bonding process in a very dry environment without any lubricant, resulting in a large friction force between a roll surface and a sample during rolling. A large amount of shear strain is caused by the uneven distribution of the 2024 layer due to rolling deformation. FIG. 2 shows an SEM image of the composite panel fabricated in this example, and it can be seen that the medium-entropy alloy particles are obviously slightly stretched along a rolling direction during the hot-roll bonding process.

The composite panel has a hardness of 90.4 HV, a tensile strength of 176 MPa, a yield strength of 120 MPa, and a strain of 19.7%.

Example 2

(1) Fabrication of a medium-entropy alloy powder: A FeCoNiCrC$_{0.5}$ medium-entropy alloy was adopted as a reinforcing phase. A corresponding mass of a powder of each element was calculated according to an atomic ratio of 1:1:1:1:0.5, and then powders were each weighed, mixed, and placed in a ball mill tank; evacuation was conducted and then argon was introduced; then high-energy ball-milling was conducted for mechanical alloying as follows: with a ball-to-material mass ratio of 12:1, dry milling was first conducted for 30 h at a rotational speed of 150 r/min, then absolute ethanol was added as a process control agent, and wet milling was conducted for 12 h at a rotational speed of 300 r/min; and the resulting powder was dried for 60 h to obtain the medium-entropy alloy powder.

(2) Fabrication of a composite powder: The medium-entropy alloy powder particles and a pure aluminum powder were mixed, where the reinforcing phase medium-entropy alloy powder particles had a mass fraction of 20%; and the resulting mixture was subjected to ball-milling with a ball mill under the protection of argon to obtain the composite powder, where the ball-milling was conducted as follows: in a ball-to-material mass ratio of 6:1, wet milling was conducted for 12 h at a rotational speed of 150 r/min, with absolute ethanol as a process control agent in a mass fraction of 20%.

(3) CIP: The molding was conducted under the following experimental parameters: holding time: 2 min, and molding pressure: 250 Mpa.

(4) Sintering and molding: The blocky solid composite was placed in a crucible, and sintered by MWS to obtain a magnetic medium-entropy alloy particle-reinforced AMC, where experimental parameters of the MWS were as follows: sintering temperature: 500° C., holding time: 40 min, heating rate: 30° C./min, and vacuum degree: less than 20 Pa.

(5) The FeCoNiCrC$_{0.5}$/Al composite made by MWS was cut into plates each with a diameter of 4 mm and a thickness of 2.2 mm, an aluminum alloy was cut into plates each with length×width of 90 mm×70 mm and a thickness of 1.2 mm, and the aluminum alloy plate was subjected to a vacuum preheating treatment in a microwave muffle furnace at 500° C. for 2 h; the composite and aluminum alloy plates were each subjected to a surface cleaning treatment with an angle grinder, sandpaper, and acetone, and after the surface cleaning treatment was completed, the aluminum alloy, the FeCoNiCrC$_{0.5}$/Al AMC, and the aluminum alloy were sequentially stacked and riveted; and a riveted composite panel was placed in a heating furnace at 450° C. for 8 min and then subjected to roll bonding immediately, with a rolling reduction of 36%, a rolling speed controlled at 30 r/min, and a rolling temperature of 120° C.

The composite panel has a hardness of 99.8 HV, a tensile strength of 189 MPa, a yield strength of 135 MPa, and a strain of 22.1%.

Example 3

(1) Fabrication of a medium-entropy alloy powder: A FeCoNiCrB$_{0.5}$ medium-entropy alloy was adopted as a reinforcing phase. A corresponding mass of a powder of each element was calculated according to an atomic ratio of 1:1:1:1:0.5, and then powders were each weighed, mixed, and placed in a ball mill tank; evacuation was conducted and then argon was introduced; then high-energy ball-milling was conducted for mechanical alloying as follows: with a ball-to-material mass ratio of 12:1, dry milling was first conducted for 30 h at a rotational speed of 150 r/min, then absolute ethanol was added as a process control agent, and wet milling was conducted for 12 h at a rotational speed of 300 r/min; and the resulting powder was dried for 60 h to obtain the medium-entropy alloy powder.

(2) Fabrication of a composite powder: The medium-entropy alloy powder particles and a pure aluminum powder were mixed, where the reinforcing phase medium-entropy alloy powder particles had a mass fraction of 20%; and the resulting mixture was subjected to ball-milling with a ball mill under the protection of argon to obtain the composite powder, where the ball-milling was conducted as follows: in a ball-to-material mass ratio of 6:1, wet milling was conducted for 12 h at a rotational speed of 150 r/min, with absolute ethanol as a process control agent in a mass fraction of 20%.

(3) CIP: The molding was conducted under the following experimental parameters: holding time: 2 min, and molding pressure: 250 Mpa.

(4) Sintering and molding: The blocky solid composite was placed in a crucible, and sintered by MWS to obtain a magnetic medium-entropy alloy particle-reinforced AMC, where experimental parameters of the MWS were as follows: sintering temperature: 500° C., holding time: 40 min, heating rate: 30° C./min, and vacuum degree: less than 20 Pa.

(5) The $FeCoNiCrB_{0.5}$/Al composite made by MWS was cut into plates each with a diameter of 4 mm and a thickness of 2.2 mm, an aluminum alloy was cut into plates each with length×width of 90 mm×70 mm and a thickness of 1.2 mm, and the aluminum alloy plate was subjected to a vacuum preheating treatment in a microwave muffle furnace at 500° C. for 2 h; the composite and aluminum alloy plates were each subjected to a surface cleaning treatment with an angle grinder, sandpaper, and acetone, and after the surface cleaning treatment was completed, the aluminum alloy, the $FeCoNiCrB_{0.5}$/Al AMC, and the aluminum alloy were sequentially stacked and riveted; and a riveted composite panel was placed in a heating furnace at 450° C. for 8 min and then subjected to roll bonding immediately, with a rolling reduction of 56.8%, a rolling speed controlled at 30 r/min, and a rolling temperature of 120° C.

The composite panel has a hardness of 124.8 HV, a tensile strength of 247 MPa, a yield strength of 180 MPa, and a strain of 30.8%.

Example 4

(1) Fabrication of a medium-entropy alloy powder: A $FeCoNiCrY_{0.5}$ medium-entropy alloy was adopted as a reinforcing phase. A corresponding mass of a powder of each element was calculated according to an atomic ratio of 1:1:1:1:0.5, and then powders were each weighed, mixed, and placed in a ball mill tank; evacuation was conducted and then argon was introduced; then high-energy ball-milling was conducted for mechanical alloying as follows: with a ball-to-material mass ratio of 12:1, dry milling was first conducted for 30 h at a rotational speed of 150 r/min, then absolute ethanol was added as a process control agent, and wet milling was conducted for 12 h at a rotational speed of 300 r/min; and the resulting powder was dried for 60 h to obtain the medium-entropy alloy powder.

(2) Fabrication of a composite powder: The medium-entropy alloy powder particles and a pure aluminum powder were mixed, where the reinforcing phase medium-entropy alloy powder particles had a mass fraction of 20%; and the resulting mixture was subjected to ball-milling with a ball mill under the protection of argon to obtain the composite powder, where the ball-milling was conducted as follows: in a ball-to-material mass ratio of 6:1, wet milling was conducted for 12 h at a rotational speed of 150 r/min, with absolute ethanol as a process control agent in a mass fraction of 20%.

(3) CIP: The molding was conducted under the following experimental parameters: holding time: 2 min, and molding pressure: 250 Mpa.

(4) Sintering and molding: The blocky solid composite was placed in a crucible, and sintered by MWS to obtain a magnetic medium-entropy alloy particle-reinforced AMC, where experimental parameters of the MWS were as follows: sintering temperature: 500° C., holding time: 40 min, heating rate: 30° C./min, and vacuum degree: less than 20 Pa.

(5) The $FeCoNiCrY_{0.5}$/Al composite made by MWS was cut into plates each with a diameter of 4 mm and a thickness of 2.2 mm, an aluminum alloy was cut into plates each with length×width of 90 mm×70 mm and a thickness of 1.2 mm, and the aluminum alloy plate was subjected to a vacuum preheating treatment in a microwave muffle furnace at 500° C. for 2 h; the composite and aluminum alloy plates were each subjected to a surface cleaning treatment with an angle grinder, sandpaper, and acetone, and after the surface cleaning treatment was completed, the aluminum alloy, the $FeCoNiCrY_{0.5}$/Al AMC, and the aluminum alloy were sequentially stacked and riveted; and a riveted composite panel was placed in a heating furnace at 500° C. for 8 min and then subjected to roll bonding immediately, with a rolling reduction of 56.8%, a rolling speed controlled at 30 r/min, and a rolling temperature of 120° C.

The composite panel has a hardness of 135.2 HV, a tensile strength of 278 MPa, a yield strength of 198 MPa, and a strain of 37.8%.

The above examples are preferred implementations of the present disclosure, but the present disclosure is not limited to the above implementations. Any obvious improvement, substitution, or modification made by those skilled in the art without departing from the essence of the present disclosure should fall within the protection scope of the present disclosure.

What is claimed is:

1. A fabrication method of a rolled ($FeCoNiCrR_n$/Al)-2024Al composite panel, comprising: adding $FeCoNiCrR_n$ medium-entropy alloy particles with high strength and toughness as a reinforcing phase to a matrix of pure aluminum to obtain a $FeCoNiCrR_n$/Al aluminum matrix composite, wherein the $FeCoNiCrR_n$ medium-entropy alloy reinforcing phase is added in an amount of 10% to 30% based on a total mass of the $FeCoNiCrR_n$/Al aluminum matrix composite, the $FeCoNiCrR_n$ medium-entropy alloy particles each have a composition with an atomic ratio expression of $FeCoNiCrR_n$, wherein R is any one from the group consisting of B, Y and C, and $0<n\leq 0.8$; and subjecting a 2024Al aluminum alloy plate and the $FeCoNiCrR_n$/Al aluminum matrix composite as raw materials to hot-roll bonding to obtain the rolled ($FeCoNiCrR_n$/Al)-2024Al composite panel.

2. The fabrication method of the rolled ($FeCoNiCrR_n$/Al)-2024Al composite panel according to claim 1, comprising the following steps:

step (1) weighing and mixing high-purity metal powders Fe, Co, Ni, and Cr and an R powder as raw materials according to a designed ratio to obtain a resulting mixed powder, and subjecting the resulting mixed powder to ball-milling in a ball mill tank to fabricate a medium-entropy alloy powder through mechanical alloying, wherein during the ball-milling, evacuation is conducted and then argon is introduced for protection;

step (2) vacuum-drying the obtained medium-entropy alloy powder, mixing particles of the medium-entropy alloy powder with the matrix of aluminum powder particles to obtain a resulting mixture, and subjecting the resulting mixture to low-energy ball-milling in a ball mill to obtain a mixed powder, wherein during the low-energy ball-milling, evacuation is conducted and then argon is introduced for protection;

step (3) drying the mixed powder, and subjecting the mixed powder to ultrasonic dispersion with an ultrasonic machine until homogeneous, followed by molding through cold isostatic pressing to obtain a blocky solid composite;

step (4) placing the blocky solid composite in a crucible, followed by sintering and solidifying through microwave sintering to obtain the medium-entropy alloy particle-reinforced aluminum matrix composite FeCoNiCrR$_n$/Al; and step (5) cutting the medium-entropy alloy particle-reinforced aluminum matrix composite FeCoNiCrR$_n$/Al into composite plates, placing one composite plate of the composite plates between two aluminum alloy plates, fixing the stacked plates through rivets, followed by hot-rolling.

3. The fabrication method of the rolled (FeCoNiCrR$_n$/Al)-2024Al composite panel according to claim 2, wherein, in the step (1), the high-purity metal powders Fe, Co, Ni, and Cr and the R powder each has a purity of higher than or equal to 99.95 wt % and a particle size of less than or equal to 40 μm.

4. The fabrication method of the rolled (FeCoNiCrR$_n$/Al)-2024Al composite panel according to claim 2, wherein experimental parameters of the ball-milling in the step (1) are as follows: a ball to material mass ratio is 8:1 to 15:1; the ball-milling comprises dry milling and wet milling; the dry milling is conducted, and then the wet milling is conducted; the wet milling is conducted with absolute ethanol as a process control agent in a mass fraction of 10% to 20%; the dry milling is conducted at a rotational speed of 100 r/min to 300 r/min for 20 h to 40 h, and the wet milling is conducted at a rotational speed of 200 r/min to 400 r/min for 10 h to 20 h; the powder obtained after the ball-milling has a particle size of 0.1 μm to 5 μm; and after the ball-milling is completed, the powder is vacuum-dried for 48 h to 72 h and then taken out; and parameters of the low-energy ball-milling in the step (2) are as follows: a ball to material mass ratio is 5:1 to 10:1; and wet milling is conducted for 10 h to 30 h at a rotational speed of 120 r/min to 180 r/min, with absolute ethanol as a process control agent in a mass fraction of 15% to 25%.

5. The fabrication method of the rolled (FeCoNiCrR$_n$/Al)-2024Al composite panel according to claim 2, wherein in the step (3), experimental parameters of the molding through the cold isostatic pressing are as follows: holding time: 2 min to 5 min, and molding pressure: 200 Mpa to 300 Mpa.

6. The fabrication method of the rolled (FeCoNiCrR$_n$/Al)-2024Al composite panel according to claim 2, wherein in the step (4), experimental parameters of the microwave sintering are as follows: sintering temperature: 400° C. to 600° C., holding time: 30 min to 50 min, heating rate: 20° C./min to 60° C./min, and vacuum degree: less than 20 Pa.

7. The fabrication method of the rolled (FeCoNiCrR$_n$/Al)-2024Al composite panel according to claim 6, wherein the step (5) comprises: cutting the medium-entropy alloy particle-reinforced aluminum matrix composite FeCoNiCrR$_n$/Al made by the microwave sintering into the composite plates each with a diameter of 3 mm to 5 mm and a thickness of 2 mm to 3 mm, cutting an aluminum alloy into aluminum alloy plates each with a length×a width of 90 mm×70 mm and a thickness of 1 mm to 2 mm, subjecting the aluminum alloy plates to a vacuum preheating treatment in a microwave muffle furnace, followed by riveting, wherein parameters of the vacuum preheating treatment are as follows: preheating temperature: 400° C. to 600° C., and holding time: 1 h to 3 h.

8. The fabrication method of the rolled (FeCoNiCrR$_n$/Al)-2024Al composite panel according to claim 7, wherein the composite plates and the aluminum alloy plates are each subjected to a surface cleaning treatment with an angle grinder, sandpaper, and acetone, and after the surface cleaning treatment is completed, a first one of the aluminum alloy plates, one of the FeCoNiCrR$_n$/Al aluminum matrix composite plates, and a second one of the aluminum alloy plates are sequentially stacked and riveted to obtain a riveted composite panel; and parameters of the hot-rolling are as follows: the riveted composite panel is placed in a heating furnace at 300° C. to 500° C. for 5 min to 10 min and then subjected to roll bonding immediately, with a rolling reduction of 20% to 60%, a rolling speed controlled at 20 r/min to 40 r/min, and a rolling temperature of 100° C. to 150° C.

* * * * *